Figure 2:
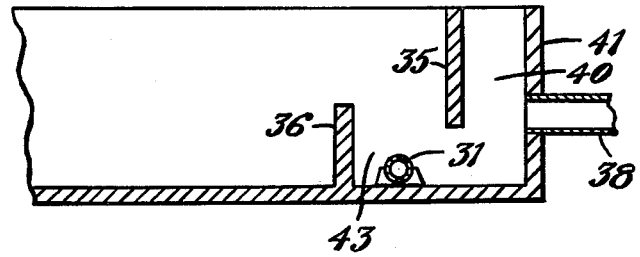

Feb. 16, 1960    P. BRADFORD    2,925,383
TREATMENT OF REFINERY WASTES
Filed Oct. 22, 1956

INVENTOR.
PURDY BRADFORD
BY R. G. Story
ATTORNEY

United States Patent Office 2,925,383
Patented Feb. 16, 1960

2,925,383

TREATMENT OF REFINERY WASTES

Purdy Bradford, Palos Park, Ill., assignor to Swift & Company, Chicago, Ill., a corporation of Illinois Application October 22, 1956, Serial No. 617,406

6 Claims. (Cl. 210—44)

This invention relates to the treatment of waste liquors and is particularly adapted to the removal of soapy materials from waste waters.

Industrial waste liquors which contain organic and other materials are commonly subjected to treatment in order to reduce pollution of natural water bodies into which the wastes are emptied. Such treatment is frequently desirable as well from an economic standpoint and alomst invariably is required by public officials who are charged with controlling the pollution of harbors, rivers and streams. Many methods of treatment have been tried and are being successfully practiced but there are still many problems peculiar to individual industries where waste liquors must be treated which contain materials, usually organic in nature, which are not readily separated by the generally practiced methods of treatment.

Considerable difficulty has been experienced in the vegetable oil refining industry in separating insoluble soaps from the condensate of the steam deodorizers. It is common practice in the refining of vegetable oils to subject the oil to a steam deodorization operation during which the oil is held in a large enclosed vessel and a vacuum drawn on its surface while steam is bubbled therethrough. The volatile materials, which include principally free fatty acids, are drawn off with the steam by the vacuum and later condensed by spraying with a cooling liquid in barometric condensers. In those refineries which are located adjacent the ocean, sea water may be used for condensing the vapors in the barometric condensers. Sea water contains large quantities of calcium and magnesium ions which react with the free fatty acids to form insoluble soaps. The soaps are widely dispersed and form insoluble flocs, which tend neither to float nor settle and will remain suspended in the liquid for long periods of time. The sea water from the condensers of the steam deodorizers is collected in a basin known as a hot well. It has proven difficult to economically separate these insoluble soaps from the hot well liquor, presumably because of their low concentration and because of their tendency to remain suspended.

It is an object of this invention to provide an improved method for treating aqueous waste to remove therefrom widely dispersed and suspended materials which tend to neither float nor settle. It is another object to treat waste liquors in such a manner as to remove the soapy constituents therefrom.

Other objects not specifically set forth will become apparent from the following detailed description.

Flotation separation of the precipitated soaps of the hot well liquors of the vegetable oil refinery industry by direct introduction of air into the liquor has generally proven ineffective. It has been proposed that the hot well liquors be aerated and the aerated liquor held for a period of time at a substantial pressure to promote intimate mixing of the air and liquor. It is thought that by the latter practice greater quantities of the air will become dissolved in the aerated liquor with the result that when the pressure is released on the waste liquor there will be large quantities of air available to coat the precipitated soaps. This latter scheme may or may not be effective for removing insoluble soaps from the hot well liquor depending apparently upon the concentration of the soap and the willingness of the one treating the material to provide ample air. The cost of such treatment may be prohibitive.

We have developed an improved method for treating an aqueous waste having a suspended load of widely dispersed and normally non-floatable insoluble floc. This is accomplished by introducing an aerated second waste water which carries fine solid particles or a precipitate into the first waste. The treated waste and the introduced aerated stream are intimately mixed and then passed to a quiescent zone where the floc and the precipitate of the two aqueous waste bodies may be floated to the surface of the combined liquors.

It has been our experience that in order to remove the insoluble soaps present in hot well sea water that there must be introduced into the sea water a second aqueous stream containing both dissolved air and a fine precipitate or fine particles. It may be that the precipitate of the introduced aerated stream provide nuclei for the conglomeration of the widely dispersed insoluble soaps found in the sea water, but in any event, in order to separate effectively the floc of the hot well sea water, the latter water must be intimately mixed with the aerated stream and this is best accomplished by conducting the aqueous bodies upwardly through a zone. It has also been our experience that by utilization of such a zone and by directing the two mixed streams upwardly therein, the floc and precipitate rises readily to the surface and may be separated in an adjacent quiescent zone.

In our preferred embodiment the aerated precipitate containing stream is a treated floor waste material of the refinery. This latter waste material contains large quantities of soluble soaps, fats, and some protein materials. The soluble soaps are first placed in an insoluble form prior to the aeration of the floor waste waters by mixing with that water a portion of the hot well sea water. The rest of the sea water, and by far the major portion of it, is introduced into the aforementioned confined zone together with the aerated floor waste. This scheme has proven very effective for the treatment of both hot well sea water and the floor waste.

Figure 1:
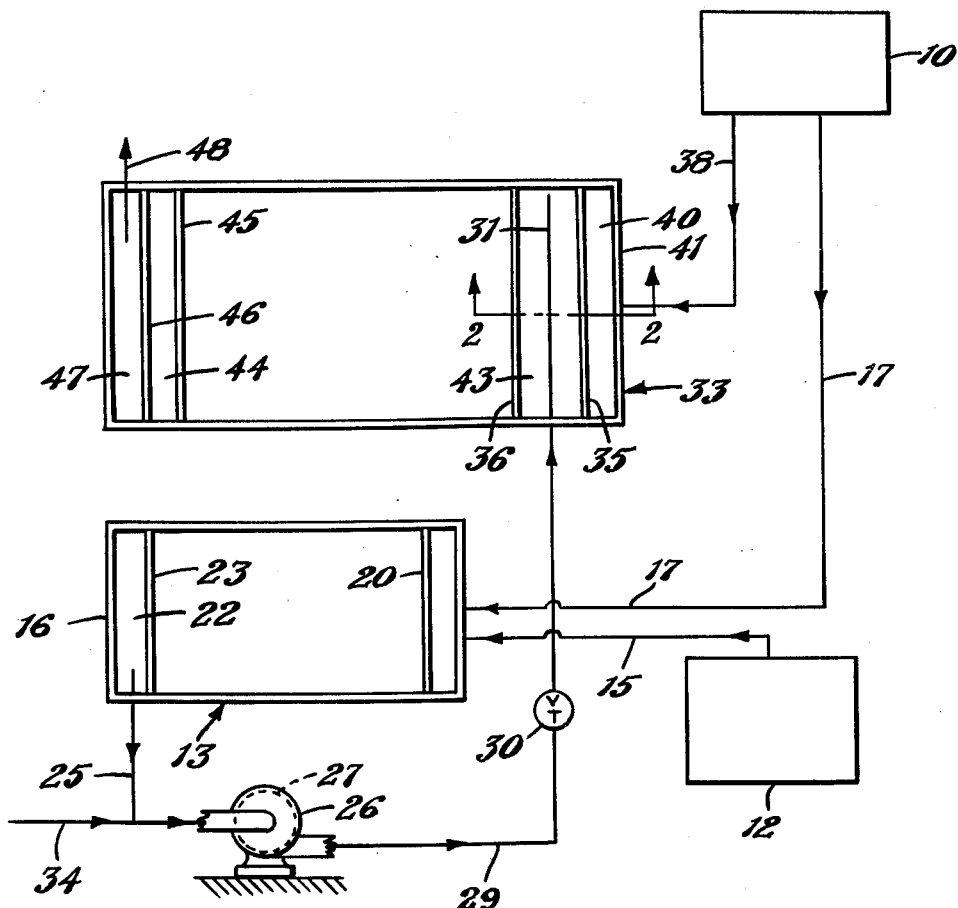

In the drawings, Figure 1 is a schematic drawing of one system for carrying out the process of the invention, and Figure 2 is a vertical cross-section taken along line 2—2 of a large detention basin illustrated in Figure 1.

Sea water condensing liquid from several barometric condensers of a vegetable oil refinery is collected in a hot well 10. The sea water, as explained before, will have a low concentration of insoluble soaps resulting from the precipitation of the free fatty acid component of the volatile material from the steam deodorizers. The floor waste waters from the refinery are collected in a collection basin 12. This latter waste will contain soluble soaps from the cleaning operations of the refinery, fats, insoluble protein materials and other refuse. The floor wastes are transferred first to a detention basin 13 through a line 15 by gravity flow. A minor portion of the hot well sea water is introduced through a line 17 by gravity flow into the same detention basin at a point adjacent the outlet of the floor waste line 15. It will be seen that there is a vertical baffle 20 spaced a short distance from that end of the detention tank where the two waste streams enter. This baffle, which reaches across the width of the tank, has its top edge at a point above the normal level of the liquid and extends downwardly through the liquid body to a point short of the bottom, leaving an area through which the introduced sea water and floor waste may pass from the baffled compartment. The purpose of the baffle is to provide quiescence within the detention basin beyond the baffle thus affording an opportunity for a portion of the solid material to float to the top of the water. The floated material, which will include principally soaps and fats, is removed from the surface of the liquid by skimming the surface of the liquids between the baffle 20 and an underflow baffle 23. The latter baffle is removed a short distance from end 16 of the basin and together with the basin end 16 forms an outlet compartment 22. The liquid passes from the detention basin proper under the baffle 23 into the compartment 22. The underflow baffle keeps the floated material in the central portion of the basin away from the outlet compartment 22. The basin may be skimmed either by hand or by a conventional apparatus.

The effluent of the detention basin is drawn through a line 25 at the base of the compartment 22 into a centrifugal type pump 26 driven by a motor 27 and forced under pressure through a line 29 to a distributor pipe 31 disposed in the bottom of a second and larger detention basin 33. An adjustable throttling valve 30 is preferably employed in line 29 adjacent the distributor 31 to regulate the back pressure on the pump 26. The mixture of hot well water and floor waste is thoroughly agitated and aerated during passage through the pump. Air is introduced into the mixture within the pump through conduit 34 either by being drawn in under suction or by being forced in under pressure. Forced introduction of the air is not the most desirable in that there is the danger that an excess of air will be added and if such occurs the pump may lose its prime and cease to function.

The aerated mixture is discharged into the second detention basin through the distributor pipe 31 which extends substantially the width of the basin adjacent the floor of the basin and between two baffles 35 and 36. The distributor pipe is preferably cylindrical in shape and has a number of openings in its underside to direct the aerated stream downward. The particular structure of the distributor pipe may be correlated with the pump and the length and diameter of conduit 29 to provide the desired high pressure needed for effective solution of the air into the liquid mixture from the detention basin 13 or preferably the desired pressure may be had by the use and regulation of the throttling valve. It has been our experience that for best results the mixture of waste liquor and sea water should be subjected to a fairly high pressure up to the point of discharge of the aerated mixture into the second skimming basin. The high pressure will increase the solubility of the air in the mixture and thereby promote better separation of the precipitate upon the introduction of the aerated mixture into the second detention basin. This high solubility may be accomplished when an aspirating pump is utilized by permitting the intake of the pump to suck in air along with the inflowing stream of liquid and properly regulating the back pressure on the pump to a degree sufficient to develop the required pressure for substantially complete solution of the air within the liquid. The preferred pressure range is 15 to 30 pounds per square inch gauge pressure. Generally speaking, pressures above 30 pounds give little additional benefit, and with pressures much below 15 pounds p.s.i. the efficiency of the system drops off considerably. The amount of air used in the process can be varied from a low of 2.5 cubic feet per thousand gallons of water aspirated through the pump to a high of 7.5 cubic feet per thousand gallons. This arrangement is somewhat flexible, and higher or lower air rates may be used with fair results. It has been our experience that the aerated water is best held under pressure for a period of time varying from 2 to 7 seconds. The major portion of the hot well sea water flows through a line 38 to the second detention basin 33. The latter line opens into the basin at one of its ends into a zone 40. Zone 40 is defined on one side by the end 41 of the basin and by a baffle 35 which is spaced a short distance therefrom. The baffle 35 rises above the surface of the liquid and extends downwardly to a point short of the bottom of the basin as best seen in Figure 2. Baffle 35 runs the width of the basin. The position of the baffle 35 directs the liquid of the zone 40 downward to the passage below the baffle where the hot well sea water escapes into a second and adjacent zone 43. The second zone is defined by the previously described baffle 35 and a baffle 36 which is removed some distance therefrom. The latter baffle butts the bottom of the basin and extends about half way up to the surface of the liquid. The baffle 36 which spans the interior width of the basin may be described as an overflow baffle as the liquid from the zone 43 passes over its top into the detention basin proper. The baffle 35 may be described as an underflow baffle. The distributor pipe lies along the bottom of the basin approximately midway between the two baffles.

In a preferred embodiment of the process of our invention, 600 gallons of liquid passed through the smaller detention basin 13 per minute. Of this 600 gallons, normally 500 gallons will be sea water from the hot well and the remaining 100 gallons will be refinery floor waste from the collection basin 12. The volume flow is held at 600 gallons per minute and if there should be an increase or decrease in the amount of floor waste available, the amount of hot well sea water is accordingly adjusted. The aerated mixture from the detention basin 13 is pumped to the second detention basin 33 at a volume rate of 600 gallons per minute. Normally about 2100 gallons per minute of the hot well sea water is added to the second basin through line 38 which means that the volume rate through the second detention basin is on the order of 2700 gallons per minute. In one installation where the refinery floor waste contains on an average of about 300 pounds of foreign materials per thousand gallons of water, the floor waste which is available at the rate of 100 gallons per minute is mixed in the smaller of the two detention basins with 500 gallons per minute flow of the hot well sea water. Air is drawn into the aspirating pump at a rate of 4 to 5 cubic feet per thousand gallons and is dissolved in the mixture under pressure of nearly 25 pounds per square inch. The aerated mixture is held under the foregoing pressure for 4 seconds before being discharged into the second detention basin. Sea water directly from the hot well is introduced to the second basin along with the aerated mixture at a volume flow of 2100 gallons per minute. Under these conditions the precipitated soap and entrapped fats and other solid material are quickly floated to the surface of the liquid in the second basin. The floated material is skimmed off the basin proper between the baffle 36 and an underflow baffle 45 either by hand or conventional apparatus. The latter baffle like the baffle 35 at the opposite end of the basin causes the waste liquid against it to flow under it into an adjacent compartment 44. The underflow baffle prevents the floated material from entering the compartment 44. From the latter compartment, the clarified waste liquid passes over a weir 46 into a removal zone 47 from whence it passes by a conduit 48 to disposal.

It will be seen from the foregoing description that only a minor portion of the floatable material in the liquor mixture of the detention basin 13 is actually floated and skimmed from the surface of that basin. The rest of the floatable material of the liquor mixture is floated in the second detention basin with the assistance of the injected air. It is believed that the precipitate of the aerated liquor mixture may provide nuclei for the floc of the hot well sea water.

Obviously many modifications and variations of the invention as hereinbefore set forth may be made without departing from the spirit and scope thereof, and therefore

I claim:

1. An improved method of treating a first aqueous vegetable oil refinery waste containing a suspended floc, the steps comprising: introducing an aerated second waste water carrying fine solid particles into said first aqueous waste, said introduced stream having at least a large share of its air load dissolved therein, intimately mixing the two aqueous wastes to distribute the air throughout the mixture and to intermingle the suspended floc and solid particles, introducing the combined wastes to a quiescent zone, floating the flocs to the surface of the combined liquids, and separating the floated floc from the liquid.

2. An improved method of treating a first aqueous vegetable oil refinery waste containing a widely dispersed and a normally suspended soapy floc, the steps comprising: introducing an aerated second soapy waste water carrying precipitate into said first aqueous waste within a confined zone having an open top, said introduced waste being under pressure at time of introduction and having at least a large share of its air load dissolved therein, passing the first aqueous waste and the introduced aerated waste in an upward direction through the zone to intimately mix said first waste and second aerated waste thereby causing the floc and precipitate of the two aqueous bodies to float to the surface of the combined liquids with the assistance of the air of the introduced waste, passing the combined liquids to a second adjacent zone wherein the floated matter is separated therefrom.

3. In the treatment of vegetable oil refinery wastes where the wastes include a sea water carrying widely dispersed and suspended insoluble soaps and a refinery waste water containing soluble soaps, the steps comprising: mixing a first portion of the sea water with the refinery waste water to precipitate the soluble soaps of the latter waste as insoluble soaps, injecting air into the mixture of sea water and refinery waste water and holding the aerated mixture under high pressure to promote dispersion of the air throughout the mixture, conducting a second portion of the sea water into a first zone, introducing the aerated mixture into said second portion of sea water adjacent the bottom of the first zone, passing the aerated mixture and said second portion of sea water in an upward direction through the first zone to intimately mix them thereby causing the floatable material of the two aqueous bodies to float to the surface of the combined liquids with the assistance of the air of the introduced mixture, passing the combined liquids to an adjacent zone wherein the floated matter is separated therefrom.

4. A process in accordance with claim 3 wherein the aerated mixture is held at a pressure during dispersion of the air throughout the mixture within the range of 15–30 pounds per square inch gauge.

5. A process in accordance with claim 3 wherein the amount of air injected into the mixture of sea water and refinery waste water is within the range of 2.5 cubic feet to 7.5 cubic feet per 1000 gallons of said mixture.

6. A process in accordance with claim 3 wherein the amount of air injected into the mixture of sea water and refinery waste water is within the range of 2.5–7.5 cubic feet per 1000 gallons of said mixture and wherein the aerated mixture is held under a pressure within the range of 15–30 pounds per square inch gauge.

References Cited in the file of this patent

UNITED STATES PATENTS

| | | |
|---|---|---|
| 1,638,977 | Avery | Aug. 16, 1927 |
| 2,120,634 | Stevenson | June 14, 1938 |
| 2,370,772 | Bowers | Mar. 6, 1945 |
| 2,509,695 | Parker | May 30, 1950 |
| 2,765,081 | Evans et al. | Oct. 2, 1956 |
| 2,765,919 | Juell | Oct. 9, 1956 |

OTHER REFERENCES

Gehm: "Water Works and Sewerage," August 1945, pp. 255–257.